United States Patent [19]

Yamamoto

[11] Patent Number: 5,626,695
[45] Date of Patent: May 6, 1997

[54] PNEUMATIC RADIAL TIRES WITH MONOSTRAND BEAD CORE FOR SMALL-SIZE PASSENGER CARS

[75] Inventor: Masahiko Yamamoto, Tachikawa, Japan

[73] Assignee: Bridgestone Corporation, Tokyo, Japan

[21] Appl. No.: 452,541

[22] Filed: May 30, 1995

[30] Foreign Application Priority Data

Oct. 20, 1994 [JP] Japan ................................ 6-279711
Apr. 25, 1995 [JP] Japan ................................ 7-123035

[51] Int. Cl.$^6$ ............................ B60C 3/00; B60C 15/04; B29D 30/48; B21F 37/00
[52] U.S. Cl. ...................... 152/454; 152/540; 156/136; 245/1.5
[58] Field of Search ........................... 152/539–540, 152/454; 245/1.5; 156/136

[56] References Cited

U.S. PATENT DOCUMENTS 3,170,662  2/1965  Anderson ........................... 245/1.5 X
5,529,106  6/1996  Yamamoto .......................... 152/540

FOREIGN PATENT DOCUMENTS 0303514   2/1989   European Pat. Off. .
0320221   6/1989   European Pat. Off. .
0655354   5/1995   European Pat. Off. .
61-110406 7/1986   Japan .
2225111   9/1990   Japan .
2286407  11/1990   Japan .
4193613   7/1992   Japan .
8108714   4/1996   Japan .
2212122   7/1989   United Kingdom ............. 152/540

Primary Examiner—Adrienne C. Johnston
Attorney, Agent, or Firm—Sughrue, Mion, Zinn, Macpeak & Seas

[57] ABSTRACT

A pneumatic radial tire for a small-size passenger car having substantially the same structure as in the conventional tire includes a pair of bead portions each with a monostrand bead core of a particular cross-sectional shape made by spiral winding of a rubberized steel wire having a particular diameter. The bead core has a particular ratio of distance between center points of adjacent steel wire windings to the diameter of the steel wire and a length overlapping a winding start point of the steel wire with a winding terminal point thereof.

5 Claims, 4 Drawing Sheets

FIG_1
PRIOR ART
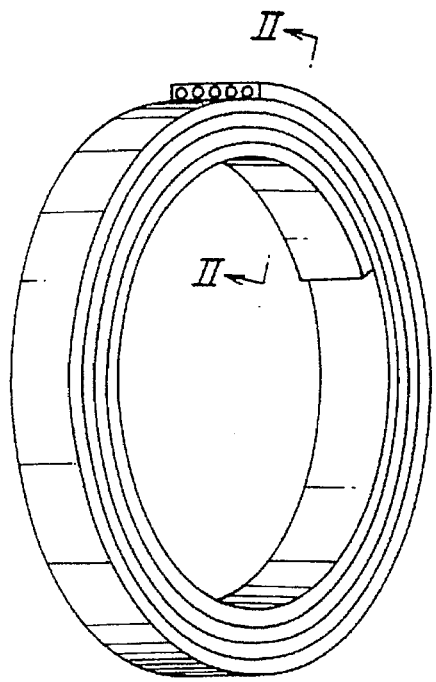
FIG_2
PRIOR ART
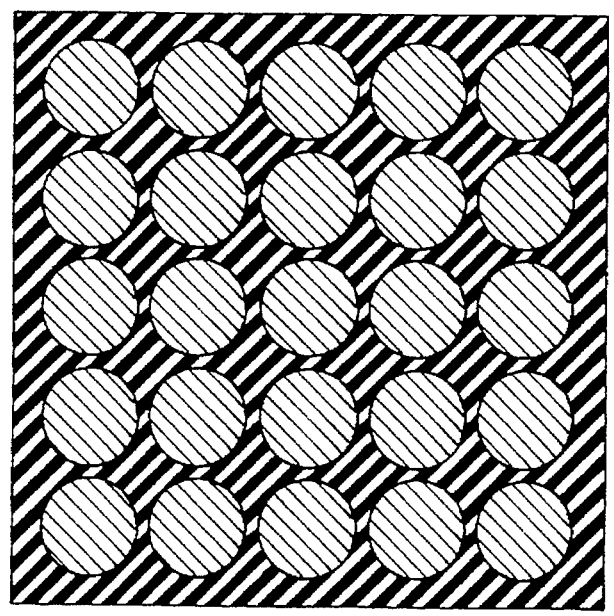

Direction of bead base

Direction of bead base

FIG_7
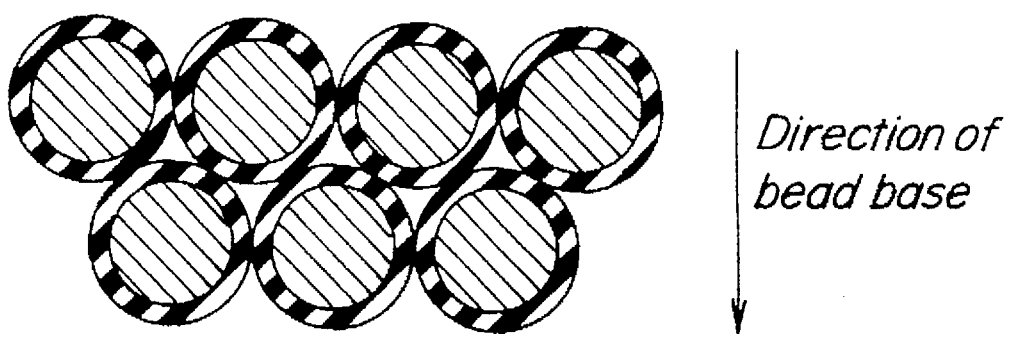
Direction of bead base ↓
FIG_8
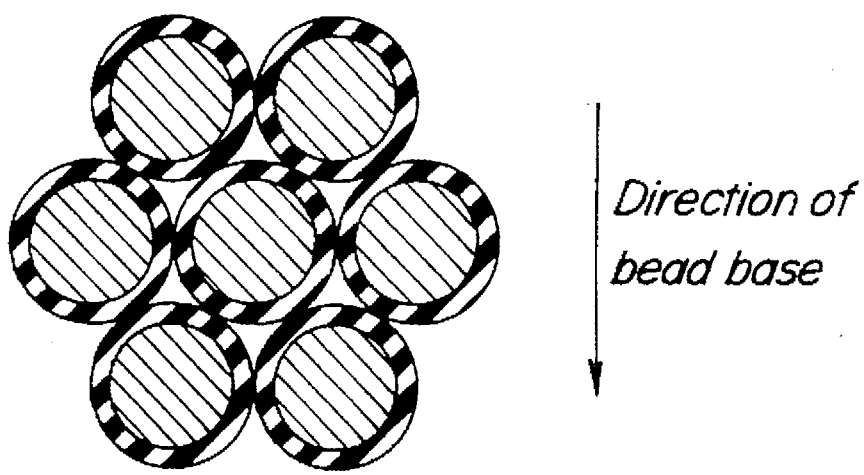
Direction of bead base ↓

PNEUMATIC RADIAL TIRES WITH MONOSTRAND BEAD CORE FOR SMALL-SIZE PASSENGER CARS

BACKGROUND OF THE INVENTION

1. Field of the Invention

This invention relates to a pneumatic radial tire for a small-size passenger car having improved steering stability by improving a structure of a bead portion without causing the lowering of tire breaking pressure (safety factor of tire) resulting from the bead portion and capable of reducing the cost and improving production efficiency by controlling an extra use of bead wire.

2. Description of the Related Art

In this type of the pneumatic tire, the bead core located in the bead portion acts to fix an end portion of the carcass ply comprised of fiber cords or steel wire cords wound therearound and to define a size of an inner periphery of the tire itself and ensure fitting to a wheel rim.

Thus, the bead core is a very important member in a pneumatic tire, so that there have been proposed various structures of the bead portion.

For instance, a known bead core is obtained by spirally winding a band-shaped rubber-wire composite containing plural wires arranged side by side and embedded therein several times into a given shape as shown in FIGS. 1 and 2 (JP-U-61-110406) and also, a monostrand bead core for use in heavy duty pneumatic tires obtained by coating a wire with uncured rubber at a given thickness to from a bead wire and then spirally winding the bead wire in a given shape (JP-A-2-286407).

In the conventional pneumatic tire, however, a relation between a length overlapping a winding start portion with a winding terminal portion in the bead core and a tire breaking pressure (safety factor of tire) is not clear, so that the tire breaking pressure in the bead portion is insufficient. In particular, the stress concentration is increased in the step portion defined by the winding start portion or the winding terminal portion to bring about the lowering of the tire breaking pressure. Furthermore, the amount of bead wire used is excessive to increase the cost and degrade the production efficiency.

Moreover, the shape of the bead core made from the band-shaped rubber-wire composite or the monostrand bead core as mentioned above is largely obtained in tire building and vulcanization steps, so that it is difficult to hold tire uniformity in circumferential and radial directions of the tire and hence the steering stability of the resulting tire product is considerably degraded.

SUMMARY OF THE INVENTION

It is, therefore, an object of the invention to solve the aforementioned problems of the conventional bead cores and to provide a pneumatic radial tire for a small-size passenger car capable of improving steering stability by controlling the disorder of tire uniformity in radial and circumferential directions due to the bead core without lowering of tire breaking pressure (safety factor of tire) and controlling an extra use of bead wire for the reduction of cost and the improvement of production efficiency.

According to the invention, there is the provision of a pneumatic radial tire for a small-size passenger car comprising a tread portion, a pair of sidewall portion extending from both side ends of the tread portion, and a pair of bead portions each including a bead core therein and extending from an inner peripheral end of the sidewall portion. The bead core is a monostrand bead core having a compact unit structure of 3 to 10 steel wire windings in cross-section and formed by spirally winding a steel wire of circular section covered with a coating rubber and binding the steel wire windings into a bundle, and the steel wire has a diameter (D) of 1.2–2.2 mm, and a ratio of distance between center points of adjacent steel wire windings in said bead core (H) to diameter (D) of the steel wire is within a range of 1.01–1.2, and a length L (mm) overlapping a winding start point of the steel wire with a winding terminal point thereof satisfies the following equation:

$$L \geq 4.0 \times 10 \times \pi r^2 \times (f/A)$$

wherein r is a radius (mm) of the steel wire, f is a tensile strength (kgf/mm$^2$) of the steel wire and A is a drawing force (kgf) of the steel wire from the coating rubber.

In preferable embodiments of the invention, the tire has a tire size of not more than 13 inches, and the diameter (D) of the steel wire is 1.25–1.55 mm, and the bead core has a hexagonal shape in cross-section having a compact unit structure of 7 steel wire windings over not less than 80% of full circumference.

BRIEF DESCRIPTION OF THE DRAWINGS

The invention will be described with reference to the accompanying drawings, wherein:

FIG. 1 is a perspective view of an embodiment of the strand structure in the conventional bead core;

FIG. 2 is a cross-sectional view taken along a line II—II of FIG. 1;

FIGS. 5 to 8 are cross-sectional views of various embodiments of the bead core according to the invention taken along an axial direction of a tire, respectively.

DESCRIPTION OF THE PREFERRED EMBODIMENTS

In the pneumatic radial tire for a small-size passenger car according to the invention, the bead core is formed as a monostrand bead core having a compact unit structure of 3 to 10 steel wire windings in cross-section, whereby the unbalance level of the tire is improved to bring about the improvement of tire uniformity and the rise of tenacity utilization. When the number of steel wire windings in the cross-section of the bead core is less than 3, the compact unit structure can not be formed. When it exceeds 10, there are caused problems such as an increase in weight, difficulty of rim assembling and the like.

Figure 3:
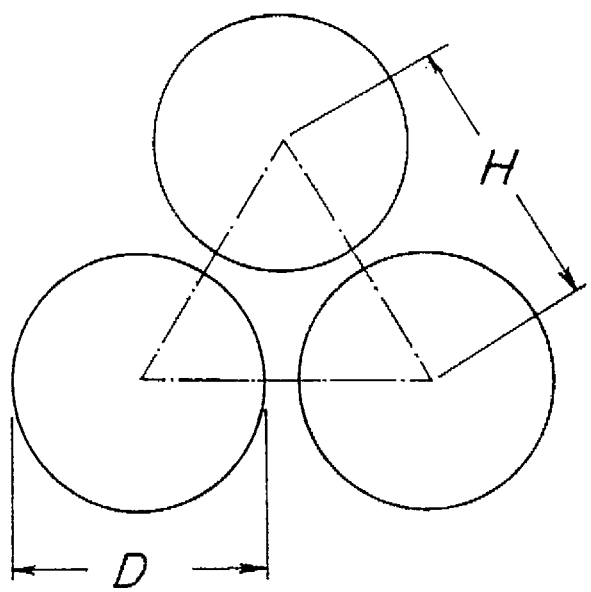
FIG. 3 is a schematic view illustrating a relation between a distance between center points of adjacent steel wire windings in a bead core and a diameter of a steel wire.

As shown in FIG. 3, the steel wire used in the bead core has a diameter (D) of 1.2–2.2 mm, preferably 1.25–1.55 mm, while a ratio of distance between center points of adjacent steel wire windings in the bead core (H) to the diameter (D) of the steel wire is within a range of 1.01–1.2, preferably 1.05–1.15. When the diameter D of the steel wire is less than 1.2 mm, sufficient rigidity and strength of the bead core can not be obtained. When it exceeds 2.2 mm, the weight is undesirably increased and the rigidity of the bead core is excessively raised to degrade the rim assembling property or rim fitness. On the other hand, when the ratio H/D is less than 1.01, the rigidity of the bead core having a ring shape becomes too large and the rim assembling property is degraded. When it exceeds 1.2, the deformation of the bead core becomes undesirably large during tire-building and vulcanization steps to degrade the tire uniformity.

Figure 4:
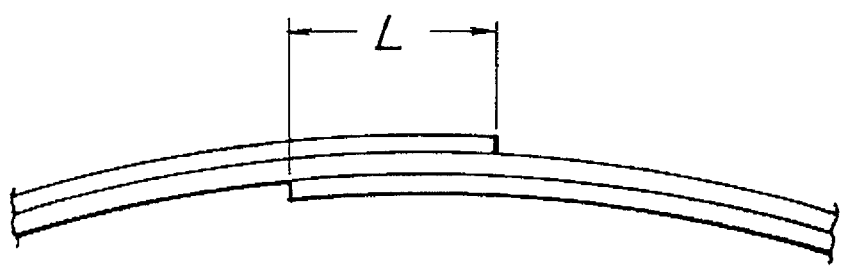
FIG. 4 is a partially side view of a monostrand bead core illustrating a length (L) overlapping a winding start point of a steel wire with a winding terminal point thereof.

In the monostrand bead core according to the invention, the overlapping length (L) between the winding start point of the steel wire and the winding terminal point thereof is a length shown in FIG. 4 and satisfies the above equation, preferably the following equation:

$$1.0 \times 10^2 \times \pi r^2 \times (f/A) \geq L \geq 5.0 \times 10 \times \pi r^2 \times (f/A).$$

In this equation, the drawing force A (kgf) of the steel wire from the coating rubber is a value obtained by drawing the steel wire from a rubberized sample of 50 mm in length at a drawing rate of 200 mm/min according to ASTM-D2229.

When the length L is less than $4.0 \times 10 \times \pi r^2 X$ (f/A), the winding terminal portion is drawn out due to peeling from the coating rubber, so that the winding terminal portion of the steel wire can not contribute to the total tenacity of the bead core and hence the tenacity utilization of the bead core is decreased to lower the safety factor of the tire. When the winding number of the steel wire is increased in order to prevent the lowering of the safety factor, the weight of the bead portion is undesirably increased.

On the other hand, when the length L exceeds $1.0 \times 10^2 \times \pi r^2 \times (f/A)$, the weight and hence the cost is undesirably increased without changing the tenacity utilization of the bead core, and also the tire uniformity is degraded.

According to the invention, the tire size of the pneumatic radial tire is preferable to be not more than 13 inches. If the tire size exceeds 13 inches, the strength becomes insufficient in the structure of the bead core according to the invention.

Furthermore, the cross-sectional shape of the bead core is rendered into a hexagonal shape having a compact unit structure of 7 steel wire windings over not less than 80% of full circumference, whereby the shape stability in the tire building and vulcanization steps is considerably improved. As a result, the improvement of tire uniformity and the rise of tenacity utilization are obtained.

By rationalizing the formation of compact hexagonal structure of monostrand and the overlapping length L between the winding starting point and the winding terminal point as mentioned above, the strength loss can be controlled to approximately zero and also the weight reduction of the tire and the reduction of the production cost can be attained.

The following examples are given in illustration of the invention and are not intended as limitations thereof.

Various test tires having tire sizes of 155/65R12 and 175/70R13 are prepared by adopting structures shown in FIGS. 2, 5, 6, 7 and 8 as a cross-sectional shape of the bead core and varying the diameter D, tensile strength f, drawing force A and overlapping length L of the steel wire, and the ratio H/D of distance between centers of adjacent steel wire windings to wire diameter as shown in Table 1.

Then, the rim assembling property of the bead core, steering stability and tire breaking pressure Pmax are measured with respect to these tires to obtain results as shown in Table 1.

Rim Assembling Property

Ten tires of each of these test tires are assembled into rims of 12×4.00 B or 5J-13, respectively, to measure an average rim-assembling time t (sec) per one tire. When the rim-assembling time in the tire of Comparative Example 1 is $t_0$, the rim assembling property of each tire is evaluated by an equation of $(t_0/t) \times 100$ and represented by an index value. The larger the index value, the better the property. Moreover, there is no problem when the index value is not less than 80.

Steering Stability

Steering stability is evaluated by a feeling test of a test driver when the tire is mounted on a small-size passenger car and actually run on road. It is represented by an index on the basis that the tire of Comparative Example 1 is 100. The larger the index value, the better the result.

Tire Breaking Pressure

Each of the test tires having a tire size of 175/70R13 is pressurized through the supply of water to measure a pressure Pmax in the breaking of the bead portion.

TABLE 1(a)

Figure 5:
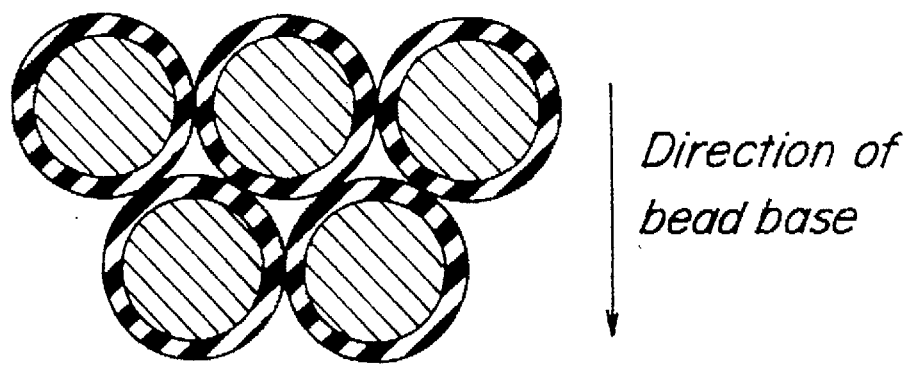
Figure 6:
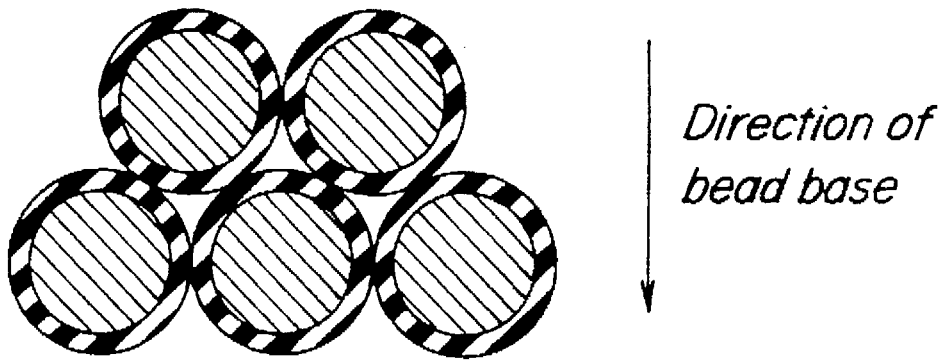

| | | Comparative Example 1 | Comparative Example 2 | Example 1 | Comparative Example 3 | Comparative Example 4 | Example 2 | Comparative Example 5 | Example 3 | Comparative Example 6 | Comparative Example 7 | Example 4 |
|---|---|---|---|---|---|---|---|---|---|---|---|---|
| Steel wire | Diameter D (mm) | 0.96 | 1.40 | 1.40 | 1.40 | 1.40 | 1.40 | 1.40 | 1.40 | 1.40 | 1.40 | 1.40 |
| | Tensile strength f (kgf/mm$^2$) | 200 | 190 | 190 | 190 | 190 | 190 | 190 | 190 | 190 | 190 | 190 |
| | Drawing force A (kgf) | 104.5 | 140.5 | 140.5 | 140.5 | 140.5 | 140.5 | 140.5 | 140.5 | 140.5 | 140.5 | 140.5 |
| Bead core | Structure | FIG. 2 | FIG. 5 | FIG. 5 | FIG. 5 | FIG. 5 | FIG. 5 | FIG. 6 | FIG. 6 | FIG. 6 | FIG. 6 | FIG. 6 |
| | Overlapping length L (mm) | 70 | 110 | 110 | 110 | 30 | 160 | 110 | 110 | 110 | 30 | 160 |
| | $4.0 \times 10 \times \pi r^2 \times (f/A)$ | 55.4 | 83.3 | 83.3 | 83.3 | 83.3 | 83.3 | 83.3 | 83.3 | 83.3 | 83.3 | 83.3 |
| | H/D | 1.30 | 1.002 | 1.15 | 1.25 | 1.15 | 1.15 | 1.003 | 1.14 | 1.28 | 1.14 | 1.14 |
| Rim assembling property (index) | | 100 | 55 | 101 | 110 | 100 | 101 | 53 | 99 | 108 | 100 | 99 |
| Steering stability (index) | | 100 | 109 | 108 | 96 | 108 | 109 | 107 | 105 | 93 | 105 | 104 |
| Tire breaking pressure Pmax (kgf/cm$^2$) | | 18.4 | 13.9 | 13.8 | 13.7 | 11.8 | 13.9 | 15.0 | 14.8 | 14.8 | 12.0 | 14.9 |

TABLE 1(b)

| | | Comparative Example 8 | Example 5 | Comparative Example 9 | Comparative Example 10 | Example 6 | Example 7 | Example 8 | Comparative Example 11 | Comparative Example 12 | Example 9 |
|---|---|---|---|---|---|---|---|---|---|---|---|
| Steel wire | Diameter D (mm) | 1.20 | 1.20 | 1.20 | 1.20 | 1.20 | 1.4 | 1.4 | 1.6 | 1.4 | 1.4 |
| | Tensile strength f (kgf/mm$^2$) | 195 | 195 | 195 | 195 | 195 | 190 | 190 | 184 | 190 | 190 |
| | Drawing force A (kgf) | 120.3 | 120.3 | 120.3 | 120.3 | 120.3 | 143.0 | 143.0 | 163.0 | 143.0 | 143.0 |
| Bead core | Structure | FIG. 8 | FIG. 8 | FIG. 8 | FIG. 8 | FIG. 8 | FIG. 8 | FIG. 7 | FIG. 8 | FIG. 8 | FIG. 8 |
| | Overlapping length L (mm) | 110 | 110 | 110 | 20 | 180 | 110 | 110 | 110 | 50 | 90 |
| | $4.0 \times 10 \times \pi r^2 \times (f/A)$ | 73.3 | 73.3 | 73.3 | 73.3 | 73.3 | 81.8 | 81.8 | 90.8 | 81.8 | 81.8 |
| | H/D | 1.002 | 1.14 | 1.27 | 1.14 | 1.14 | 1.14 | 1.14 | 1.12 | 1.14 | 1.14 |
| Rim assembling property (index) | | 75 | 103 | 112 | 104 | 104 | 99 | 98 | 78 | 98 | 99 |
| Steering stability (index) | | 107 | 105 | 91 | 104 | 103 | 120 | 101 | 119 | 119 | 121 |
| Tire breaking pressure Pmax (kgf/cm$^2$) | | 15.0 | 14.9 | 14.8 | 12.7 | 15.0 | 19.2 | 16.3 | 19.8 | 13.0 | 18.8 |

As mentioned above, in the pneumatic tire for the small-size passenger car according to the invention, steering stability can be improved by rendering the bead core in the bead portion into a monostrand bead core of a special structure without causing the lowering of tire breaking pressure (safety factor of tire) and degrading the rim assembling property. Furthermore, the loss of the strength in the bead core can be controlled to approximately zero, whereby the extra use of the steel wire can be controlled and the weight reduction of the tire and the reduction of the cost can be attained and the production efficiency can be improved.

What is claimed is:

1. A pneumatic radial tire for a small-size passenger car comprising; a tread portion, a pair of sidewall portion extending from both side ends of the tread portion, and a pair of bead portions each including a bead core therein and extending from an inner peripheral end of the sidewall portion, said bead core being a monostrand bead core having a compact unit structure of 3 to 10 steel wire windings in cross-section and formed by spirally winding a steel wire of circular cross-section covered with a coating rubber and binding the steel wire windings into a bundle, said steel wire having a diameter (D) of 1.2–2.2 mm, and a ratio of distance between center points of adjacent steel wire windings in said bead core (H) to the diameter (D) of said steel wire is within a range of 1.01–1.2, and a length L in mm overlapping a winding start point of said steel wire with a winding terminal point thereof satisfies the following equation:

$$L \geq 4.0 \times 10 \times \pi r^2 \times (f/A)$$

wherein r is a radius in mm of the steel wire, f is a tensile strength in kgf/mm$^2$ of the steel wire and A is a drawing force in kgf of the steel wire from the coating rubber.

2. A pneumatic radial tire according to claim 1, wherein the tire has a tire size of not more than 13 inches.

3. A pneumatic radial tire according to claim 1, wherein the diameter (D) of the steel wire is 1.25–1.55 mm.

4. A pneumatic radial tire according to claim 1, wherein the bead core has a hexagonal shape in cross-section having a compact unit structure of 7 steel wire windings over not less than 80% of full circumference.

5. A pneumatic radial tire according to claim 1, wherein said ratio of distance (H) to diameter (D) is within a range of 1.05–1.15.

* * * * *